2,797,374

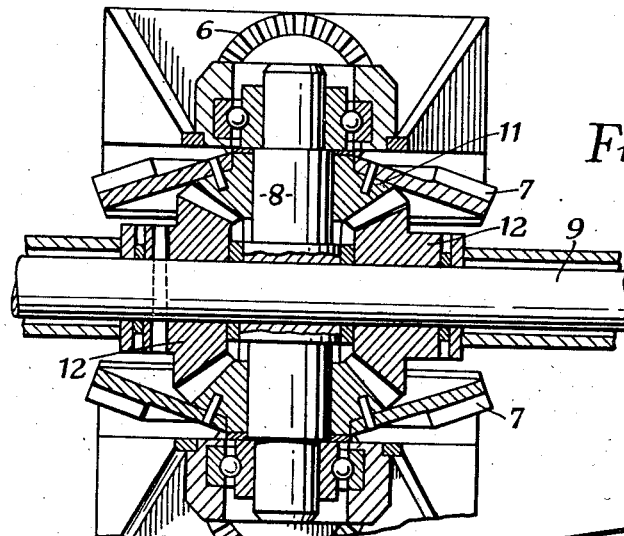
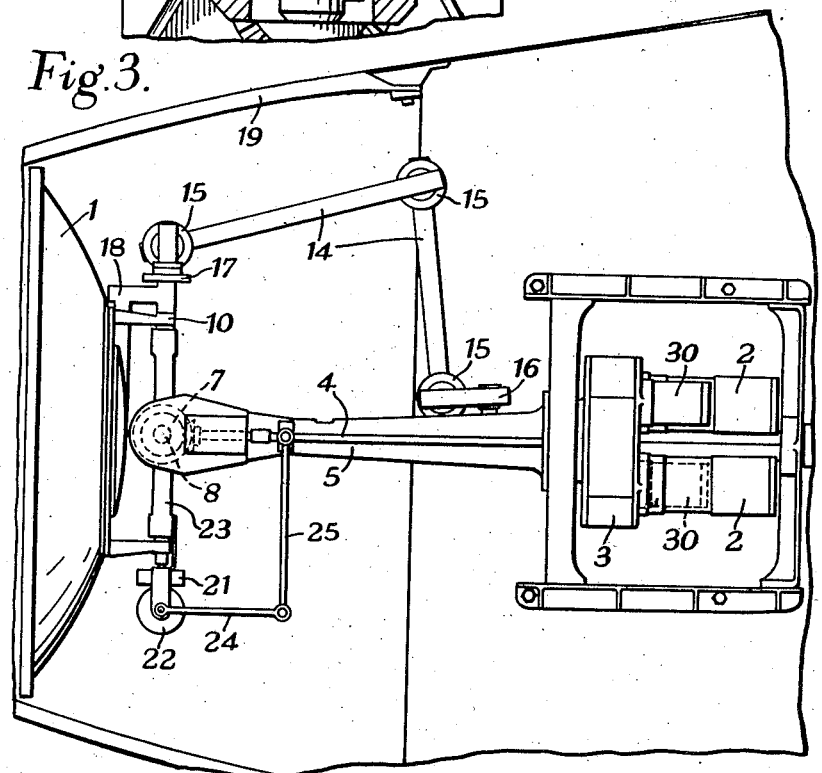

PLURAL MOTOR CONTROL SYSTEM FOR RADAR SCANNER DRIVE

Alfred Montague Atton, Bushey, and Lawrence Alfred Fletcher, Leeds, England, assignors to Savage and Parsons Limited, Watford, England, a British company Application November 6, 1952, Serial No. 318,982

Claims priority, application Great Britain November 8, 1951

5 Claims. (Cl. 318—8)

The present invention relates to apparatus for transmitting rotary movement about axes in two planes at right angles to each other. The novel drive provided by the invention is applicable to gun carriages, turrets, directors, searchlights and the like.

The particular application of the invention is however to radar scanners and in particular to a new method of and apparatus for activating radar scanners to give independent azimuth and elevation movements.

It is also an object of the invention to provide a scanner having a lower inertia than conventional scanners of the type having an azimuth and elevation drive, by mounting the drive motors so that they do not have to be moved bodily.

It is also an object of the invention to construct a radar scanner for airborne radar installations having azimuth and elevation movements about axes which are tangential or nearly tangential to the scanner reflector to enable the reflector to be of a diameter only a little less than that of the radome in which it is situated.

According to the present invention a drive comprises two motors each driving to respective co-axial pinions of a differential gear, the driven element being mounted to turn with a further pinion in driven engagement with the said co-axial pinions driven from the motors.

It will be appreciated that in this way that where the driven element is a scanner it will be capable of rotary movement about the axis of the motor bevel gears and also about the axis of the bevel gear to which it is connected, which is at right angles to the first axis. When these two axes are arranged respectively vertical and horizontal with respect to the aircraft, they serve as azimuth and elevation axes for the scanner and reflector.

In order that the invention may be more clearly understood one form of the device is more fully described with reference to the accompanying drawings wherein:

Figure 2 is a vertical section through the differential gear box on line II—II of Figure 1.

Figure 3 is a general plan view of the scanner.

Figure 1:
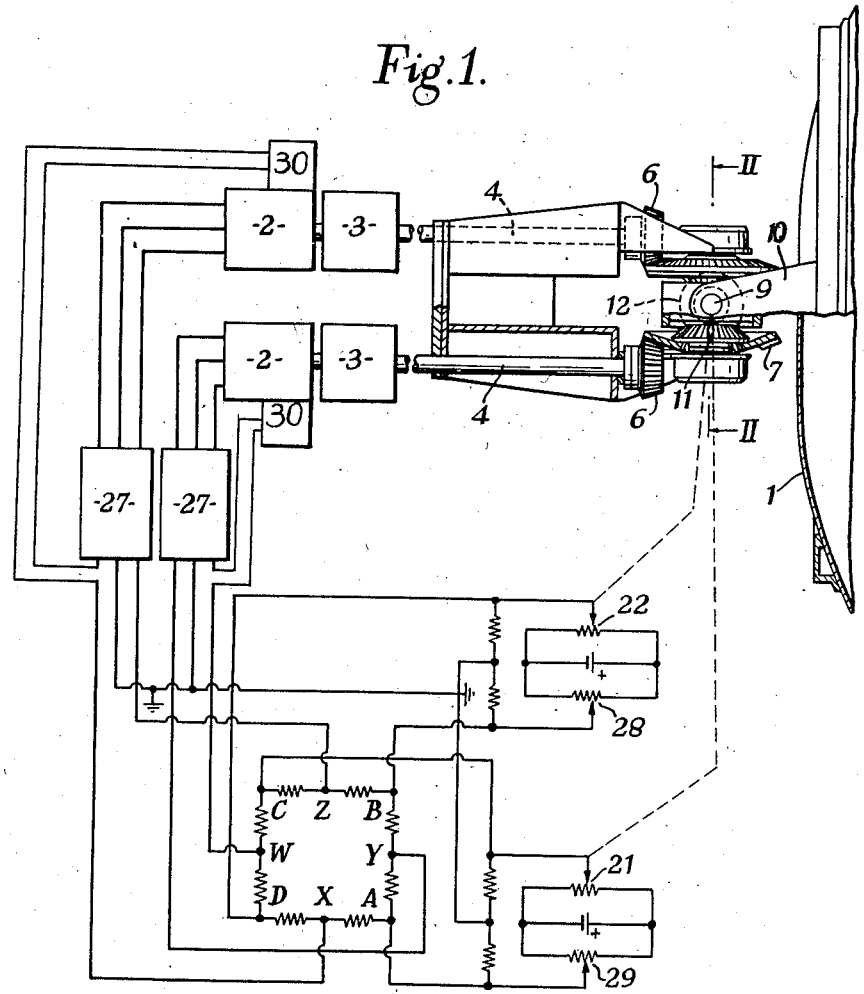
Figure 1 is a side view of the scanner partially diagrammatic and partially in section.

The radar scanner shown in the accompanying drawings is intended for installation in fighter aircraft.

In the construction of radar scanner herein shown the reflector 1 is mounted for angular movement both in elevation and in azimuth. The drive to the reflector is arranged so that it may be moved in these two directions either independently or at the same time. The drive to the reflector is transmitted from two variable speed, reversible drive motors 2, each of which drive through independent speed reducing gear boxes 3, conveniently mounted in the same housing, to drive shafts 4. The gear box and motor assembly is mounted between bearers supported directly on the airframe (see Figure 3) and is preferably mounted rotatably so as to permit roll stabilization being applied if desired. The reflector 1 and the various parts through which drive is transmitted to it are mounted on a cantilever frame member 5 projecting forwardly from the gear box bearers.

A differential gear box unit is attached to the front end of the frame member 5, to which drive is transmitted through the two shafts 4, which each carry bevel pinions 6 attached to their forward end. The bevel gears 6 mesh with crown wheels 7 freely mounted on a vertical shaft 8, which coincides with the axis of the movement of the reflector 1 in azimuth. The shaft 8 is bushed centrally to receive a cross shaft 9 on which the reflector 1 is mounted and to which it is attached by arms 10 which are keyed to the shaft 9. Bevel gears 11 are pinned to the crown wheels 7 and mesh with bevel gears 12, which are mounted on the shaft 9. One of the gears 12 is keyed to the shaft 9 whilst the other is freely rotatable thereon, but is located longitudinally of the shaft by means of thrust bearings. The second of the gears 12 serves only to balance the thrust on the gears 11 and might in some circumstances be omitted.

It will be seen from Figure 1 that, owing to the arrangement, when both shafts 4 turn in the same direction the two crown wheels rotate in opposite directions.

It will be appreciated from the foregoing description that if the two motor shafts 4 turn at the same speed, but in opposite directions, then the two bevel pinions 11 on the shaft 8 will turn together at the same speed. In this event the bevel pinions 12 remain locked between the pinions 11 and they, together with the shaft 9, follow the movement of the pinions 11, rotating about the axis of the shaft 8, thus imparting a movement in azimuth to the reflector 1. Reversal of the motors 2 will cause reversal of the rotation of the reflector about the axis of the shaft 8, so that an oscillatory motion can be imparted to the scanner to give the desired azimuth movement for an airborne scanner unit.

When, on the other hand, the two motors 2 are rotated at the same speed in the same direction, the bevel wheels 12 will be rotated about the axis of the shaft 9 without being moved bodily round the axis of the shaft 8. Since the scanner reflector 1 is attached to the shaft 9 and the shaft is keyed to one of these bevel wheels 12, the scanner will in these conditions receive a rotation about the axis of the shaft 9, which is at right angles to the first axis of rotation. This rotation imparts a movement in elevation to the scanner and may be likewise reversed by reversing the direction of both the motors.

In the two conditions just described the scanner is given azimuth movement or elevation movement only. Thus, in order to obtain a combination of azimuth and elevation movement, the two drive shafts 4 are rotated at different speeds to each other, either in the same or opposite directions, and both azimuth and elevation movement will be simultaneously imparted to the scanner. For example, if one motor is stopped and the other rotated, one of the bevel pinions 11 will remain stationary while the other rotates. Bevel pinion 12 keyed to the shaft 9 will rotate in one direction and thus rotate shaft 9 about its own axis, and the other bevel pinion 12 will also rotate, but in the opposite direction, and this rotation will not be transmitted to shaft 9 since the other bevel pinion 12 is not keyed to shaft 9. Because one of the bevel pinions 11 is stationary, both bevel pinions 12, which are rotating in opposite directions, will run around the circumference of the stationary bevel pinion 11 in the same direction, thus swinging shaft 9 around with them. Movement of the reflector 1 will therefore occur both in elevation, because of the rotation imparted to shaft 9, and in azimuth, because of the swing movement imparted to shaft 9.

Simultaneous movement in azimuth and elevation will occur when both bevel pinions 11 are rotated, but at different rates, either in the same or opposite directions.

The only difference from the situation in which one of the bevel pinions 11 is kept stationary will be that the rate at which movement in azimuth or elevation will occur will be different. Thus if one bevel pinion 11 is rotating in the same direction as the other but at a lower speed, and all of the pinions are the same size, the shaft 9 would be rotated about its own axis at a rate equal to the difference in the speeds, and would simultaneously be swung about the axis of the bevel pinions 11 at a rate equal to the average of the two speeds. However, if one bevel pinion 11 is rotating in the opposite direction from the other bevel pinion 11, the shaft 9 would be rotated about its own axis at a rate equal to the sum of the speeds, while shaft 9 would simultaneously be swung around its own axis at a rate equal to the average of the difference of the speeds.

It will therefore be understood that by selecting different combinations of speeds and directions of rotation, any desired simultaneous motion of the reflector 1 between the limits of only elevation movement and only azimuth movement can be obtained.

This method of activating radar scanners, whilst primarily intended for airborne use in fighter aircraft, is equally applicable for land or sea operation.

In the construction described the co-axial feed to the scanner dipole (not shown) cannot be led through directly from the frame member 5 and to procure the feed an elaborate linkage structure is employed. This is shown in Figure 3 and comprises two rigid co-axial sections 14 connected to each other and at their ends by rotary joints 15. The first co-axial section 14 takes the feed from a stationary section 16 attached to the member, whilst the second section 14 feeds through a broad band T-junction (not shown) to a rotary joint 17 in a plane at right angles to the joints 15 and located on the axis of the shaft 9. The joint 17 feeds to the final co-axial section 18 and the dipole or other type of feed.

It will be seen from Figure 3 that the reflector 1 can be turned through a wide angle from its zero position shown, both in elevation and azimuth to enable a broad search to be carried out. It will also be appreciated that the construction is such that the maximum diameter of the volume swept by the scanner reflector is only a little larger than the diameter of the scanner reflector, because the elevation and azimuth axes are close to the back of the reflector. The space requirements of the reflector are therefore exceptionally low and it can be fitted with the periphery of the reflector very close to the radome 19 as shown.

It will be appreciated that the azimuth or elevation movement of the scanner is a function of the movement of both motors 2.

It is therefore necessary to exercise simultaneous control of both motors to produce the necessary speed differential between them which speed differential causes the desired movement of the reflector 1.

This may be effected by taking positional signals indicating the azimuth and elevation positions of the axes of the differential by means of potentiometers actuated by the respective shafts. These signals are compared with control signals from a source outside the device to give respective azimuth and elevation error signals. The potentiometers used for this purpose are indicated in Figure 3. They consist of an elevation position potentiometer 21 and azimuth position potentiometer 22, the bodies of which are rigidly fixed to one another and to the stationary housing 23 of the shaft 9.

The wiper arm of potentiometer 21 is fixed to the end of the shaft 9 so that the position of the wiper arm will correspond to the angular position of the reflector 1 relative to its elevation axis. The wiper arm of the potentiometer 22 is attached through a pair of pivoted links 24, 25 to the member 5 so as to produce rotation of the wiper arm relative to the body, as the body of the potentiometer moves with the reflector in its movement in azimuth.

The movements of the shafts 4 to produce azimuth and elevation movements is seen to involve movement of both the driving shafts and for this reason the two motors 2 are controlled by means of amplifier units 27, to which they are responsive. These amplifier units may be of any conventional design and form no part of the present invention. They may be magnetic or electrohydraulic or preferably electronic amplifiers.

In order to produce the correct signal to apply to the amplifier units 27 for the control of the servomotors 2, a control network is used for resolving the two error signals.

The resolving network comprises eight relatively high impedance resistors connected in pairs between four fixed points A, B, C and D.

Azimuth positional and control signals from signal generators 22 and 28 are respectively applied to points D and B, whilst elevation positional and control signals from signal generators 21 and 29 are applied to points C and A.

Points Y, Z, W and X which are respectively the mid points between A—B, B—C, C—D, D—A respectively are used for the application of the control signals to the amplifiers 27. One amplifier is connected between X and Z and the other between Y and W, which are diametrically opposite points in the network, balanced coupled amplifiers being employed.

A change in potential between points A and C (which will be symmetrical about ground) such that A becomes positive with respect to C results in points X and Y becoming positive with respect to points W and Z. The two amplifiers thus receive signals of a sense which result in clockwise rotation of both servomotor shafts.

Conversely if A becomes negative with respect to C anti-clockwise rotation of both servomotor shafts results.

Again, change in potential between points B and D such that D becomes positive with respect to B results in points W and X becoming positive with respect to points Y and Z. The connections to the amplifiers are such that the first amplifier obtains a signal giving rise to a clockwise rotation of the first servomotor and the second amplifier obtains a signal giving rise to anti-clockwise rotation of the second servomotor.

Conversely if D becomes negative with respect to B the first amplifier receives a signal resulting in anti-clockwise rotation of the first servomotor and the second amplifier receives a signal resulting in clockwise rotation of the second servomotor.

If signals of either positive or negative sense are applied simultaneously between A, C, and B, D, signals appear at W, X, Y, and Z which are a composite or net result of the individual signals, giving rise to composite servomotor movements. It is thus seen that a positive or negative signal applied between points A and C satisfies the conditions necessary for positive or negative elevation of the scanner, while the application of a potential of positive or negative sense between B and D satisfies the conditions necessary for positive or negative azimuth rotation respectively.

It is seen that the two motors contribute to both azimuth and elevation motion and that both error signals are cancelled simultaneously as a result of the movement of the reflector 1 resulting from the composite servomotor movements which tend to move the reflector to cancel the error signals.

The controlling signals may be derived from constantly moving potentiometers as indicated in the drawings or by wave form generators, the varying controlling signals always staying ahead of the movement of the reflector tending to correct the error signals, whereby any scan pattern for search purposes may be formed. The control signals may also be error signals resulting from split beam techniques for locked-follow systems. The methods of generation of control signals of this type is however well known in this art and the origin of the signals form no part of this invention.

Velocity feed-back for purposes of damping or velocity control may be effected by means of tachometer generators 30 driven from the gear trains 3. For damping or velocity control the output of the tachometer generators is fed through a resolving network similar to that described above in order to relate the velocity signals to their respective axes. The resolved signals are fed back and mixed in correct phase and proportion with the error signals obtained from the main resolving network at the input to the amplifiers.

Alternatively the required damping or velocity control signals may be obtained directly from the azimuth and elevation scanner axes respectively by means of tachometer generators on these axes or by deriving the required signal from the respective positional signals by known techniques.

The motors 2 may be replaced by hydraulic motors and the necessary control be obtained by a suitable electrohydraulic system, which may itself take a form analogous to the electrical resolving network set out above. Alternatively the necessary resolution can be effected electrically by the same electrical resolving network as above described and the output of the amplifiers employed to control valves in the hydraulic system of the motors.

We claim:

1. In a drive for a driven element, rotatable about two axes in planes perpendicular to each other, the combination of a differential gear box having two co-axial input pinions and two differential pinions in mesh with said input pinions, said differential pinions being mounted on a common shaft extending through said pinions and having ends extending outwardly beyond said pinions, one of said differential pinions being freely rotatable on said shaft and the other of said differential pinions being secured thereto to cause rotation of said shaft, two reversible motors each arranged to drive a respective input pinion, and a driven element secured to the outer ends of said shaft and spanning said differential gear box so as to rotate about the axis of said shaft and to move with said shaft about the axis of the input pinions.

2. The combination as claimed in claim 1, further including means for producing varying azimuth and elevation control signals, means on said common shaft for producing azimuth and elevation position signals, means for opposing said control signals and said position signals to produce respective azimuth and elevation error signals, a resolving electrical network, means for applying said error signals to said network, a pair of amplifiers connected to said resolving network to receive signals therefrom, and two driving motors, each of said amplifiers being connected to and in control of one of said driving motors, one driving motor connected to each input pinion.

3. The combination as claimed in claim 2, wherein the means for producing azimuth and elevation position signals comprise a pair of potentiometers, each of which has a wiper arm concentric with and rotatable with respect to the potentiometer wire, the axes of said potentiometers lying respectively in the planes of the azimuth and elevation axes of the scanner, the elements of said potentiometers being attached to moving and stationary parts of said scanner in such manner that the elements of said potentiometers adopt angular positions corresponding respectively to the azimuth and elevation deflections.

4. In a drive for a driven element rotatable about two axes in planes at right angles, the combination of two variable speed, reversible motors, two co-axial bevel pinions freely mounted on a common shaft each driven by one of said motors, a further pair of bevel pinions located between and in driven engagement with said co-axial pinions and mounted on a second shaft journalled in said first shaft, one of said bevel pinions being secured to said second shaft and the other of said bevel pinions being freely mounted thereon, a driven element secured to said second shaft outwardly of said pinions so as to turn with said shaft and thus be rotatable about the axis of said shaft, means connected with the driven element for producing two independent position signals indicating the angular deflection of the driven element from a normal position about its two axes respectively, means for generating two variable control signals corresponding to the desired angular positions of said driven element with respect to its two axes, means for comparing each position signal with its corresponding control signal to produce separate error signals indicating the difference between the desired angular position and the actual angular position of the driven element with respect to its two axes, an electrical network for resolving said error signals, a pair of amplifiers to receive signals from said resolving network and for amplifying the same for application to said motors to cause rotation thereof in a sense tending to cancel out said error signals.

5. In a drive for a radar scanner rotatable about two axes in planes perpendicular to each other, the combination of a support member, a differential gear box mounted on the front end of said support member, a pair of variable speed, reversible motors mounted on said support member, a pair of parallel drive shafts arranged longitudinally of said support member and connected to said motors respectively for drive, each of said drive shafts carrying a bevel pinion at its forward end, said differential gear box comprising a pair of co-axial input pinions mounted in a plane perpendicular to the plane of said parallel drive shafts, a pair of crown wheels, each secured respectively to one of said input pinions and in mesh with one of said bevel pinions, a cross shaft mounted perpendicular to the axis of said input pinions and a pair of output pinions mounted on said cross shaft and each in mesh with both of said input pinions, one of said output pinions being secured to said cross shaft, so that the cross shaft rotates therewith, the other of said output pinions being freely mounted on said shaft and a scanner reflector member secured to said cross shaft outwardly of said output pinions.

References Cited in the file of this patent

UNITED STATES PATENTS

| 1,667,718 | Connell | May 1, 1928 |
| 2,130,899 | Peters | Sept. 20, 1938 |
| 2,433,837 | Dawson | Jan. 6, 1948 |
| 2,436,582 | Lear | Feb. 24, 1948 |
| 2,456,020 | Portras et al. | Dec. 14, 1948 |
| 2,487,429 | Edwards | Nov. 8, 1949 |
| 2,559,834 | Williams et al. | July 10, 1951 |
| 2,639,411 | Schafer | May 19, 1953 |
| 2,688,700 | Lewis | Sept. 7, 1954 |